United States Patent

Matolcsy et al.

[11] 3,867,446
[45] Feb. 18, 1975

[54] PROCESS FOR THE PREPARATION OF SUBSTITUTED CHLOROACETANILIDES

[75] Inventors: Gyorgy Matolcsy; Barna Bordas, both of Budapest, Hungary

[73] Assignee: Eszakmagyarorszagi Vegyimuvek, Sajobabony, Hungary

[22] Filed: May 24, 1973

[21] Appl. No.: 363,418

[52] U.S. Cl. .......................................... 260/562 B
[51] Int. Cl. .......................................... C07c 103/34
[58] Field of Search ................................ 260/562

[56] References Cited
UNITED STATES PATENTS
3,758,579  9/1973  Martin et al. .................... 260/562

OTHER PUBLICATIONS
Klosa, J. Praktische Chemie, Vol. 19, p. 45–55 (1963).
Bose, J. Indian Chem. Soc., Vol. 31, p. 108–110 (1954).

*Primary Examiner*—Harry I. Moatz
*Attorney, Agent, or Firm*—Young & Thompson

[57] ABSTRACT
Substituted chloroacetanilides of the general formula (I),

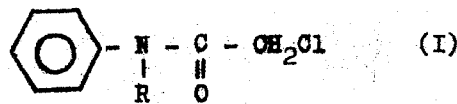

wherein R represents a $C_{1-4}$ alkyl group, are prepared by reacting the appropriate N-alkyl-anilide of the general formula (II)

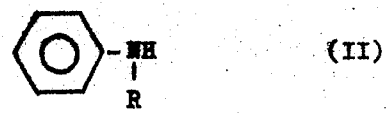

with chloroacetic acid in the presence of phosphorous oxychloride at a temperature above 150°C, under anhydrous conditions.

Using the new process of the invention the reaction time can be lowered to a great extent, and the products are obtained with higher yields and in more pure state.

2 Claims, No Drawings

PROCESS FOR THE PREPARATION OF SUBSTITUTED CHLOROACETANILIDES

This invention relates to a novel process for the preparation of substituted chloroacetanilides of the general formula (I)

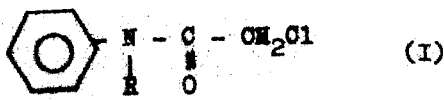  (I)

wherein R represents a $C_{1-4}$ alkyl group.

According to a known method for the preparation of substituted chloroacylanilides, N-alkyl-anilides are acylated in the presence of phosphorous trichloride at about 100° C temperature (Hungarian Patent Specification No. 159 044). This reaction proceeds within about 3 hours. According to the experiences obtained in connection with this reaction phosphorous trichloride cannot be replaced by phosphorous oxychloride, since under the reaction conditions the reaction does not set in up to the boiling point of phosphorous oxychloride, i.e. up to 105° C.

Now we have found, unexpectedly, that when a mixture of an N-alkyl-anilide of the general formula (II)

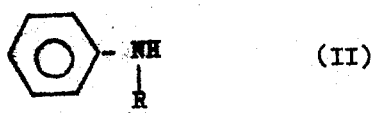  (II)

wherein R has the same meanings as defined above, phosphorous oxychloride and chloroacetic acid is heated after the first exothermic reaction state (where the reaction temperature spontaneously rises to 100° C) to about 150° C, a vigorous reaction accompanied with hydrogen chloride evolution sets in, and the reaction terminates at 170° C within about 0.5 hours with the formation of the appropriate chloroacetanilide.

Accordingly, this invention relates to a process for the preparation of substituted chloroacetanilides having the general formula (I), wherein a N-alkylanilide of the general formula (II) is acylated with chloroacetic acid in the presence of phosphorous oxychloride at a temperature above 150° C, preferably at 170° C, under anhydrous conditions.

This invention is based on the discovery that in the first stage of the reaction phosphorous oxychloride is bound by the appropriate N-alkyl-anilide in an exothermic reaction with the liberation of one mole of hydrogen chloride, and this intermediate starts to react with chloroacetic acid only at a temperature above 150° C. This latter reaction proceeds very quickly, and runs presumably with the decomposition of the intermediate.

The new process of the invention has the following advantages over the known one:

a. The reaction time can be lowered to about 1/6th of that necessary in the process utilizing phosphorous trichloride, accordingly the capacity of the expensive equipments can be increased to a great extent. This fact makes also possible the continuous production of the aimed substituted chloroacetanilides.

b. The yields are higher by about 10 percent, and the products can be obtained in more pure state.

c. Due to the fact that in the first stage of the reaction the mixture warms spontaneously to about 100° C, the heat requirements of the process are lowered to a great extent.

This process of the invention is elucidated by the aid of the following non-limiting Example.

Example

N-Isopropyl-chloroacetanilide 33.5 g. (0.248 mol.) of N-isopropyl-aniline are charged into a round-bottom flask equipped with a stirrer, reflux condenser, addition funnel and addition inlet, and 20.1 g. (12 ml., 0.131 mol.) of phosphorous oxychloride are added to the base with stirring. Thereafter 25 g. (0.265 mol.) of monochloroacetic acid are added to the mixture in one portion, whereupon the mixture warms rapidly to about 100° C. When the exothermic reaction subsides, the mixture is heated in an oil bath to 170° C, and kept at this temperature for 0.5 hours. During this reaction hydrogen chloride is evolved. Thereafter the reaction mixture is cooled to 70° C, 150 ml. of 70° C water are added to the rapidly stirred mixture, and the total mixture is allowed to cool with stirring. The congealed product of 20°C temperature is washed with water on a filter, thereafter it is dried. 47.5 g. of yellowish-white, crystalline product are obtained; m.p.: 70°–71 ° C. The crude product is recrystallized from cyclohexane to yield 45 g. of pure N-isopropyl-chloroacetanilide melting at 80° C. Yield: 87 percent.

Chlorine content:
calculated: 16.74% found: 16.71%

What we claim is:

1. A process for the preparation of a substituted chloracetanilide having the formula

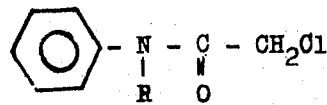

wherein R represents a $C_{1-4}$ alkyl group, in which a N-alkylanilide of the formula

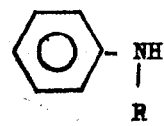

wherein R has the same meanings as defined above, is acylated with chloracetic acid in the presence of phosphorous oxychloride at a temperature above 150° C, under anhydrous conditions.

2. A process as claimed in claim 1, in which the reaction is carried out at 170° C.

* * * * *